United States Patent [19]

Shimozawa

[11] Patent Number: 5,199,013
[45] Date of Patent: Mar. 30, 1993

[54] OPTICAL HEAD APPARATUS APPLICABLE TO OPTICAL DISC APPARATUS

[75] Inventor: Kenji Shimozawa, Sagamihara, Japan
[73] Assignee: TEAC Corporation, Japan
[21] Appl. No.: 841,886
[22] Filed: Feb. 25, 1992

Related U.S. Application Data

[63] Continuation of Ser. No. 464,904, Jan. 16, 1990, abandoned.

[30] Foreign Application Priority Data

Jan. 18, 1989 [JP] Japan .................. 1-3941[U]

[51] Int. Cl.⁵ .................................. G11B 7/12
[52] U.S. Cl. ...................... 369/44.12; 369/44.23
[58] Field of Search ............... 369/44.12, 44.23, 44.24, 369/112, 110, 109; 250/201.5

[56] References Cited

U.S. PATENT DOCUMENTS

| | | |
|---|---|---|
| 4,561,032 | 12/1985 | Matsumoto et al. |
| 4,689,780 | 8/1987 | Ohara et al. ............... 369/44.12 |
| 4,721,368 | 1/1988 | Deguchi et al. ............ 350/377 |
| 4,764,912 | 8/1988 | Ando et al. |
| 4,797,868 | 1/1989 | Ando ....................... 369/44.12 |
| 4,804,835 | 2/1989 | Ando ....................... 369/44.23 |
| 4,817,072 | 3/1989 | Toide et al. ................. 369/44.12 |
| 4,951,274 | 8/1990 | Iwanaga et al. |
| 4,973,832 | 11/1990 | Marchant et al. |
| 5,015,835 | 5/1991 | Ohuchida et al. ............ 369/44.23 |
| 5,060,212 | 10/1991 | Fujita et al. ................ 369/44.12 |

FOREIGN PATENT DOCUMENTS

| | | | |
|---|---|---|---|
| 60-121547 | 6/1985 | Japan ............... | 369/112 |
| 60-231929 | 11/1985 | Japan ............... | 369/44.12 |
| 61-240442 | 10/1986 | Japan ............... | 369/44.12 |
| 63-228428 | 9/1988 | Japan ............... | 369/44.23 |

Primary Examiner—Donald McElheny, Jr.
Attorney, Agent, or Firm—Andrus, Sceales, Starke & Sawall

[57] ABSTRACT

An optical head apparatus applicable to an optical disc apparatus having an optical disc comprises a light source emitting a light beam, and an optical system transmitting the light beam emitted from the light source onto a surface of the optical disc and transmitting a light beam reflected on the surface of the optical disc to a first optical detector and to a second optical detector. The optical system includes a beam splitter splitting the light beam reflected by the surface of the optical disc into a first light beam traveling toward the first optical detector and a second light beam traveling toward the second optical detector, and a transparent member fixed to the beam splitter, through which the second light beam passes and causing astigmatic difference in the second light beam.

6 Claims, 4 Drawing Sheets (A)

(B)

(A)

(B)

OPTICAL HEAD APPARATUS APPLICABLE TO OPTICAL DISC APPARATUS

CROSS REFERENCE TO RELATED APPLICATION

The present application is a continuation application of U.S. patent application Ser. No. 07/464,904, filed Jan. 16, 1990, and now abandoned.

BACKGROUND OF THE INVENTION

The present invention relates to an optical head apparatus that is applicable to an optical disc apparatus such as an optical file apparatus and the like.

This type of optical head apparatus should preferably have as small a number of parts as is possible in order to facilitate the miniaturization and assembly of the apparatus.

FIG. 1 shows a conventional type of an optical head apparatus that is applicable to an optical magnetic disc apparatus (an optical disc apparatus).

A magnet 12 records information (binary data) with respect to an optical magnetic disc 11. A laser beam 14 emitted from a semiconductor laser element 13 passes through an optical system comprising a lens 15, a beam splitter 16 and an objective lens 17 and is focussed onto a surface of the optical magnetic disc 11. The laser beam 14 focussed onto the surface of the optical magnetic disc 11 is reflected. The reflected beam 18 reflected by the surface of the optical magnetic disc 11 has status (such as polarization status, for example) in accordance with the information recorded magnetically onto the optical magnetic disc 11. The reflected laser beam 18 passes through the objective lens 17, is reflected by a beam splitter 16 and then passes an ¼ wavelength plate 19. When the reflected laser beam 18 passes the ¼ wavelength plate 19, the plane of polarization is rotated 45° and the proportions of the P-polarized light component and the S-polarized light component become approximately 1:1. The reflected laser beam 18 that has passed ¼ wavelength plate 19 then passes through lenses 20 and 21 to reach a polarizing beam splitter 22. The polarizing beam splitter 22 separates the irradiated reflected laser beam 18 into the two components of an S-polarized light beam 18s and a P-polarized light beam 18p.

The P-polarized light beam 18p is irradiated to a light receiving element 23. This light receiving element 23 is divided into two elements and each of the two element output detection signals of level in accordance with the amount of light received. The S-polarized light beam 18s separated by the polarizing beam splitter 22 passes through a cylindrical lens 24 and is irradiated to a light receiving element 25. The cylindrical lens 24 operates as a lens for one direction only and has not lens operation for light entering it at right angles and so an astigmatic difference is generated in a laser beam that has passed through the cylindrical lens 24 difference. The astigmatic difference refers to the difference between the focussing position in a certain direction and the focussing position in a direction perpendicular to that. In addition, the light receiving element 25 is divided into four elements and each of these elements output detection signals with levels in accordance with the amount of light received.

The detection signals from each of the elements of the light receiving element 23 are input to a differential amplifier 26 and an adder 28. A tracking error signal is output from an output terminal 20 of the differential amplifier 26. The tracking error signal expresses the amount of difference of the position for the irradiation of the laser beam from the track on the optical disc 11. The detection signals output from each of the elements of the light receiving element 25 are input to an operation circuit 32. This operation circuit 32 generates a focus error signal on the basis of the Astigmatic Method. The focus error signal expresses the out-of-focus quantity of a spot which is formed on the optical magnetic disc 11 by the laser beam. The focus error signal from the operation circuit 32 are output from a focus error terminal 31. The output signal from the adder 28 are input to the non-reversed input terminal of a differential amplifier 27 and the output signal from the operation circuit 32 is input to a reversed input terminal of the differential amplifier 27. The reflected laser beam 18 reflected by the surface of the optical magnetic disc 11 is polarized in accordance with the recorded information (into either a P-polarized light component beam or an S-polarized light component beam) and so reproduction signal in accordance with the recorded information is output from the output terminal 29 of the differential amplifier 27.

In a conventional optical head apparatus having the configuration as has been described above, the cylindrical lens 24 and the polarizing beam splitter 22 are provided separately in a case (not indicated in the figure). Accordingly, it is troublesome to both assemble them and to perform adjustments such as the alignment of the optical axes. In addition, there is also a relatively large number of parts in the optical system.

SUMMARY OF THE INVENTION

Accordingly, the general object of the present invention is to provide a novel and useful optical head apparatus which can be effectively applied to optical disc apparatus, in which the problems described heretofore are eliminated.

A more specific object of the present invention is to provide an optical head apparatus for which the optical system has a small number of components and for which assembly and adjustment are facilitated.

The above objects are achieved by an optical head apparatus applicable to an optical disc apparatus having optical disc on which information has been recorded, comprising, a light source emitting a light beam, and an optical system transmitting the light beam emitted from the light source onto a surface of the optical disc and transmitting a light beam reflected on the surface of the optical disc to a first optical detector to reproduce information recorded on the optical disc and to a second optical detector to detect focus error on a basis of astigmatic difference of an irradiated light beam, the optical system including a beam splitter splitting the light beam reflected by the surface of the optical disc into a first light beam traveling toward the first optical detector and a second light beam traveling toward the second optical detector, and a transparent member fixed to the beam splitter, through which the second light beam passes and causing astigmatic difference in the second light beam, so that the second light beam having the astigmatic difference is irradiated to the second optical detector.

DESCRIPTION OF THE PREFERRED EMBODIMENTS

Figure 1:
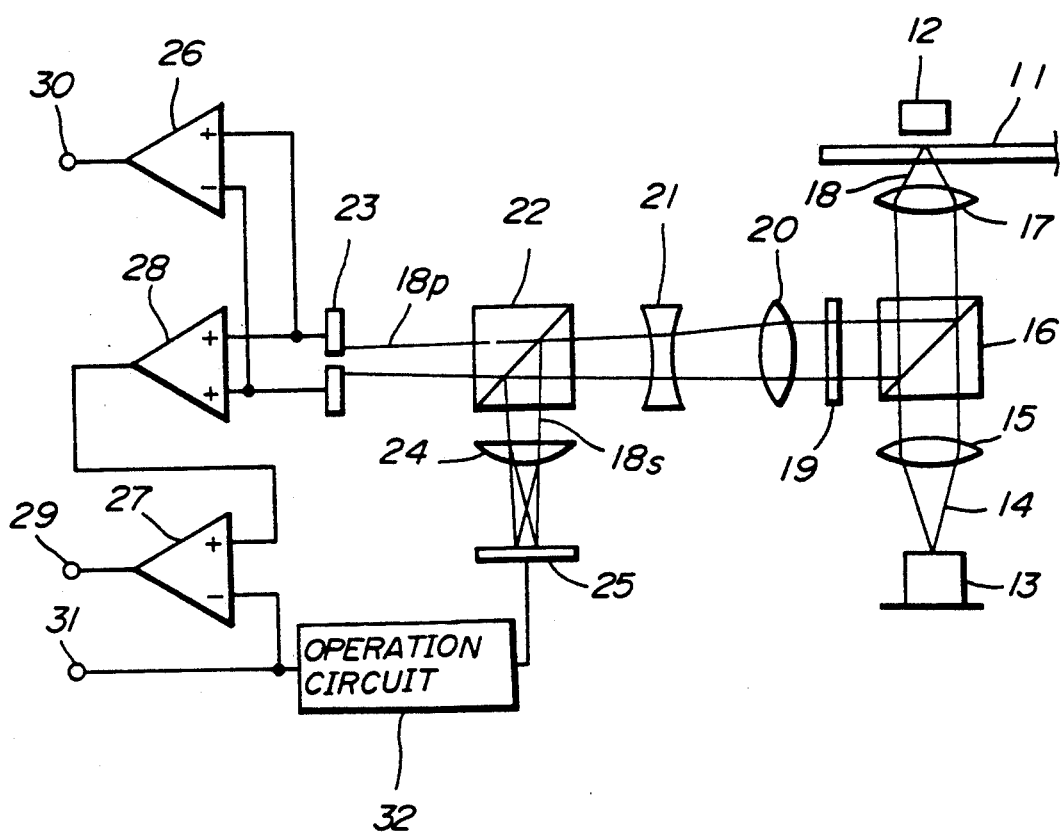
FIG. 1 is a view showing a configuration of a conventional optical head apparatus.
Figure 2:
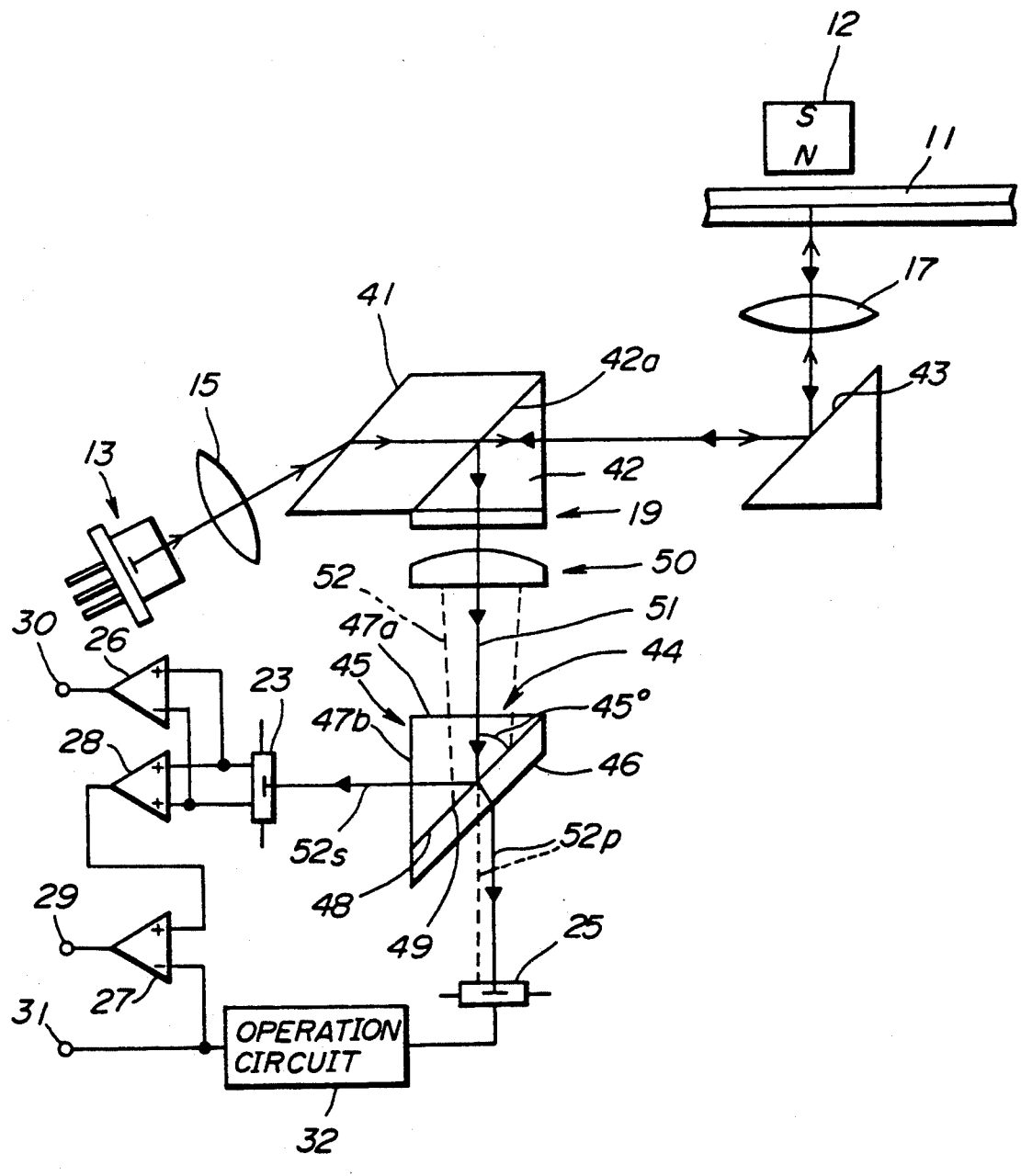
FIG. 2 is a view showing an embodiment according to the present invention.

An embodiment of an optical head apparatus according to the present invention is shown in FIG. 2. In FIG. 2, portions that have the same function as those indicated in FIG. 1 are indicated using the same numerals.

A semiconductor laser element 13 emits a laser beam (P-polarized light beam). The laser beam from the semiconductor laser element 13 passes through a lens 15 and is irradiated to a beam shaping prism 41. A laser beam refracted by an incident surface of the beam shaping prism 41 is shaped when it passes through the beam shaping prism 41. This laser beam then passes through a prism 42, is reflected by a reflecting prism 43, passes through an objective lens 17 and is focussed onto a optical magnetic disc 11.

The surface opposing the surface of the beam shaping prism 41 to which the laser beam is irradiated and the inclined surface of the prism 42 are adhered together by an adhesive made from ultraviolet cure resin and the same adhesive is also used to adhere a ¼ wavelength plate 19 to the prism 42. A film 42a is formed on a connection surface of the prism 42 and the beam shaping prism 41. A great part of a P-polarized light beam from the beam shaping prism 41 side passes through the film 42a and a S-polarized light beam from the optical magnetic disc 11 side is reflected on the film 42a.

As has been described above, the reflected laser beam that is reflected by the surface of the optical magnetic disc 11 passes through the objective lens 17 in the opposite direction, is reflected by the reflecting prism 43 and is irradiated to the prism 42. A part of the laser beam irradiated to the prism 42 is reflected by the film 42a as has been described above, passes through an ¼ wavelength plate 19 and a plano-convex lens 50 and is irradiated to a polarizing beam splitter 45. This polarizing beam splitter 45 has surfaces 47a and 47b that are at right angles to each other, and an inclined surface 48 to form a right-angle triangular column. A polarizing film 49 through which a P-polarized light component beam passes and on which a S-polarized light component beam is reflected is formed by the vapor deposition method on the inclined surface 48 of the polarizing beam splitter 45. In addition, the inclined surface 48 of the polarizing beam splitter 45 has a transparent plate 46 adhered to it by an adhesive made from ultraviolet cure regin. This is to say that the polarizing beam splitter 45 and the transparent plate 46 are integrated and thus form a compound optical component 44. This compound optical component 44 is assembled inside a case (not indicated in the figure) so that the laser beam from the plano-convex lens 50 is irradiated to the surface 47a of the polarizing beam splitter 45, and so that the inclined surface 48 of the polarizing beam splitter 45 is inclined at 45° with respect to the optical axis of the plano-convex lens 50.

Of the light beam 52 converging from the plano-convex lens 50 and irradiated to the polarizing beam splitter 45, the S-polarized light component beam 52s is irradiated to and reflected by a polarizing film 49 formed on the inclined surface 48 and emitted from surface 47b of the polarizing beam splitter 45. In addition, the P-polarized light component beam 52p of these converging light beam 52 passes through the polarizing film 49 and the transparent plate 46.

Figure 3:
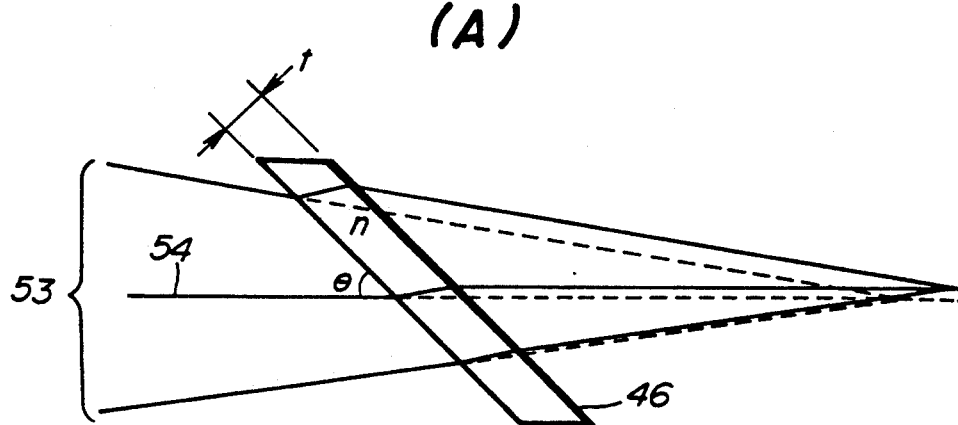
FIGS. 3(A) and 3(B) are views showing a status where astigmatic difference is generated in a laser beam by a transparent plate.
Figure 3:
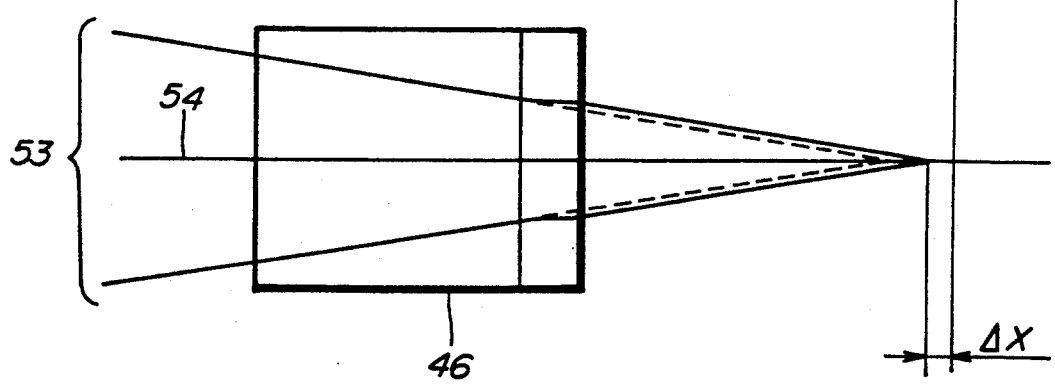

In general, the transparent plate that has an inclination at a predetermined angle with respect to the light beam produces astigmatism. Accordingly, as indicated in FIG. 3, when the transparent plate 46 is inclined at an θ with respect to the optical axis 54 of the light beam 53, a deviation between the convergence position in the direction of the meridinal surface of the light beam 53 passing the transparent plate 46 (refer to FIG. 3(A)) and the convergence position in the sagittal direction of the light beam 53 (refer to FIG. 3(B)) is produced. The amount of this deviation is the astigmatic difference Δx. This astigmatic difference Δx is determined by the following formula when the thickness of the transparent plate 46 is t, the refractive index is n, and the angle of inclination of the transparent plate 46 with respect to an optical axis 54 of the transparent plate 46 is θ.

$$\Delta x = \frac{(n^2 - 1)\sin^2\theta}{(n^2 - \sin^2\theta)^{\frac{3}{2}}} \times t \qquad (1)$$

The astigmatism caused by the transparent plate is for example, disclosed in Japanese Patent Laid-open No. 167863-1984.

Figure 4:
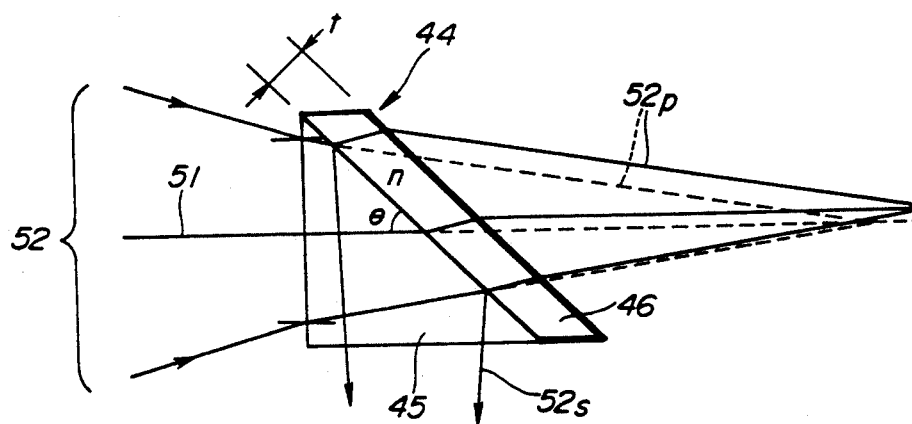
FIGS. 4(A) and 4(B) are views showing the status where astigmatic difference is generated in a laser beam by a transparent plate by an optical system in which the polarizing beam splitter and transparent plate of FIG. 2 are combined.
Figure 4:
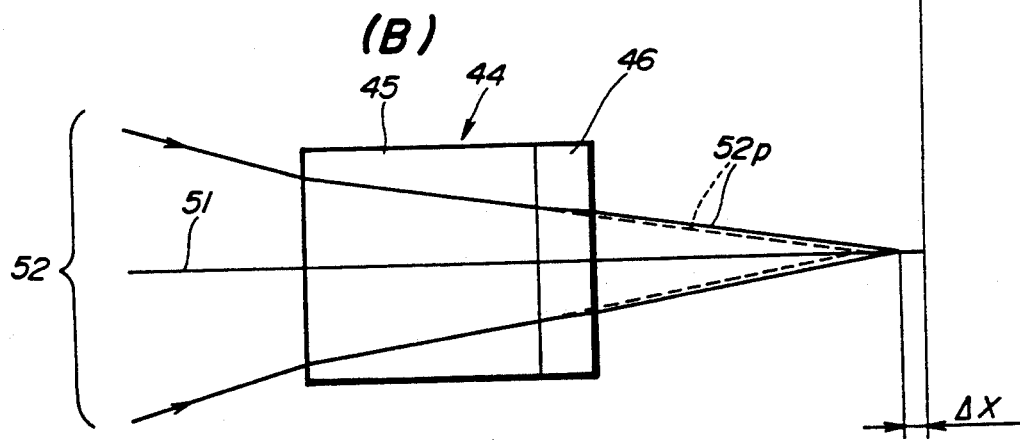

In FIG. 2, the transparent plate 46 of the compound optical component 45 is inclined at an θ=45° with respect to the optical axis 41 and so the P-polarized light component beam 52p passing through the transparent plate 46 generates an astigmatic difference Δx. This is to say that as in indicated in FIG. 4, the P-polarized light component beam 52p passing through the transparent plate 46 has a deviation Δx between the convergence position in the direction of the meridinal surface (refer to FIG. 4(A)) as has been described above and the convergence position direction of the sagittal surface (refer to FIG. 4(B)).

If for example, the material of the transparent plate 46 is BK-7, and if the wavelength λ of the laser beam is such that λ=780 nm, then the refractive index n of the transparent plate 46 will be n=1.51073. Then, if the thickness t of the transparent plate 46 is t=1.5 mm, and the angle of inclination θ such that θ=45°, then according to formula (1) above, the astigmatic difference Δx=will be Δx=400 μm.

The S-polarized light component beam 42s emitted from the surface 47b of the polarizing beam splitter 45 is irradiated to the light receiving element 23 as has been described above, and tracking error signal corresponding to the detection signals from the light receiving element 23 is output from the output terminal 30 of the differential amplifier 26. In addition, the P-polarized light component beam that passes through the transparent plate 46 and for which astigmatism is generated is also irradiated to the light receiving element 25. The focus error signal is generated by the operation circuit 32 in accordance with the detections signal from the light receiving element 25. The focus error signal is output from the focus error terminal 31. Then, the reproduction signal corresponding to the information recorded on the optical magnetic disc 11 is output from the output terminal 29 of the differential amplifier 27.

As has been described above, when an astigmatic difference $\Delta x = 400$ μm is generated in the P-polarized light component beam 42p irradiated to the light receiving element 25, the above described focus error signal is used as the basis for focus control to be performed for a range corresponding to the astigmatism $\Delta x = 400$ μm. An appropriate astigmatic difference $\Delta x$ is determined on the basis of the optical system components that are used, and the performance and size of the light receiving elements.

In addition to the function of the transparent plate 46 in generating astigmatism, the transparent plate 46 also has the function of protecting the polarizing film 49 formed in the inclined surface 48 of the polarizing beam splitter 45.

As has been described above, the transparent plate 46 is adhered to the inclined surface 48 of the polarizing beam splitter 45 and so the transparent plate 46 must be inclined with respect to the light beam. This inclination of the transparent plate 46 causes astigmatic difference in the light beam that passes through this transparent plate 46. Because the polarizing beam splitter 45 and the transparent plate 46 are integrated, the positioning of the polarizing beam splitter 45 and of the transparent plate 46 can be performed at the same time so that assembly and adjustment of the optical system are facilitated.

The present invention therefore enables the number of parts of the optical system to be reduced and for the number of processes required for assembly and adjustment to be reduced. As a result, it is possible to provide an optical head apparatus that is more compact and for which the manufacturing cost can be reduced.

The present invention is not limited to the aforementioned embodiments, and variations and modifications may be made without departing from the scope of the invention.

What is claimed is:

1. An optical head apparatus applicable to an optical disc apparatus having an optical disc on which information has been recorded, comprising:
    a light source emitting a light beam; and
    an optical system transmitting the light beam emitted from said light source onto a surface of the optical disc and transmitting a light beam reflected on the surface of the optical disc to a first optical detector to reproduce information recorded on the optical disc and to a second optical detector to detect focus error on a basis of astigmatic difference of an irradiated light beam, said optical system including a beam splitter splitting the light beam reflected by the surface of the optical disc into a first light beam traveling toward the first optical detector and a second light beam traveling toward the second optical detector, and a transparent member fixed to said beam splitter, through which said second light beam passes and causing astigmatic difference in said second light beam, so that said second light beam having the astigmatic difference is irradiated to said second optical detector.

2. The optical head apparatus as claimed in claim 1, wherein said beam splitter has a surface inclined with respect to an optical axis of said second light beam through which said second light beam passes, and wherein said transparent member has a transparent plate fixed to said inclined surface of said beam splitter.

3. The optical head apparatus as claimed in claim 1, wherein said beam splitter has a prism which is in the shape of a right-angled triangular column, and said second light beam passes through a inclined surface of said prism.

4. The optical head apparatus claimed in claim 3, wherein said prism has a polarizing prism of which a polarizing film is formed on the inclined surface.

5. The optical apparatus as claimed in claim 2, wherein said transparent plate is adhered to said inclined surface of said beam splitter by a adhesive.

6. The optical apparatus as claimed in claim 5, wherein, said adhesive comprises ultraviolet cure regin.

* * * * *